Nov. 3, 1964   L. BÖLKOW ETAL   3,155,342
VTOL AIRCRAFT CONSTRUCTION
Filed May 22, 1962   2 Sheets-Sheet 1

Inventor:
LUDWIG BÖLKOW and
ERICH HABERKORN
By: McGlew and Toren
Attorneys

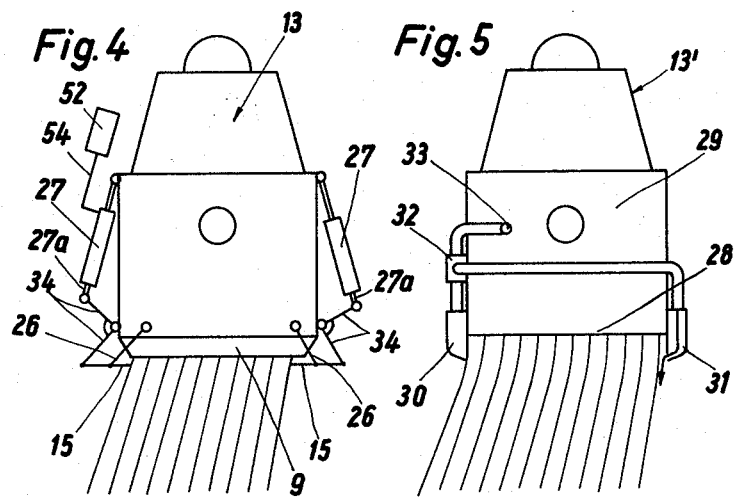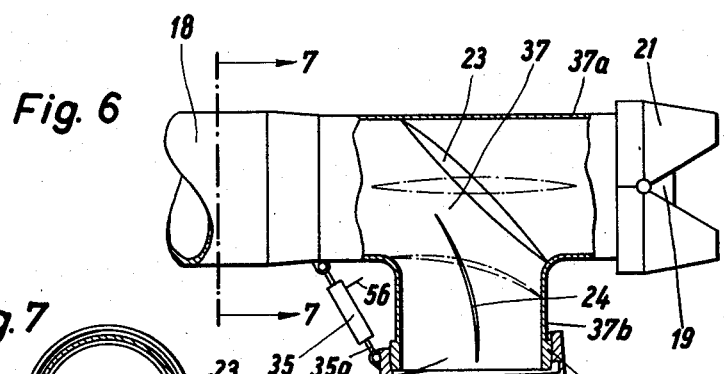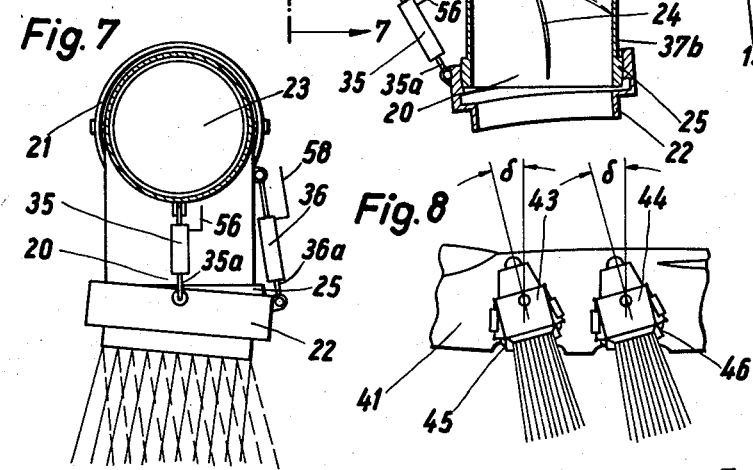

ically, or in some instances, for the purpose of generating
3,155,342
VTOL AIRCRAFT CONSTRUCTION
Ludwig Bölkow, Grunwald, near Munich, and Erich
Haberkorn, Riemerling, near Munich, Germany, assignors to Bölkow-Entwicklungen Kommanditgesellschaft,
Ottobrunn, near Munich, Germany
Filed May 22, 1962, Ser. No. 196,661
Claims priority, application Germany May 25, 1961
11 Claims. (Cl. 244—12)

This invention relates in general to aircraft construction and in particular to a new and useful aircraft including an arrangement of lift-off or vertical propulsion engines and sustaining or forward propulsion engines thereon and to improved lift-off and combination forward and lift-off engine construction.

Prior to the present invention, it was known to provide arrangements of power units including those provided principally for lifting the aircraft for substantially vertical flight, and those provided principally for horizontal forward flight propulsion. In those instances where single engines are mounted to perform both functions and are pivotally mounted for shifting from vertical to horizontal flight, great difficulty is encountered in effecting such shifting and providing for a smooth transition from one flight stage to the other. In those instances where separate engines are provided for vertical and forward flight, during forward flight, it is essential that the engine which supplies the propulsive power be operating with sufficient power to sustain the aircraft with the use of the aircraft wings after the lift-off engines are no longer active. Most of the difficulty involved with systems of this nature is that the forward drive with a so-called sustaining flight or "marsch" engine is not always sufficiently powerful during the transition to aerodynamic flight from the substantially vertical flight during lift-off. This is particularly acute when the transition from vertical flight to horizontal flight is made rapidly. A further disadvantage in aircraft of this type is that the power plant systems and arrangements are usually very complicated and the mechanism for effecting the transition from vertical take-off power plant use to horizontal flight is both complicated and expensive.

In accordance with the present invention, there is provided an aircraft which includes one or more lift-off engines, preferably arranged adjacent to or forward of the center of gravity of the aircraft and provided with means for controlling the direction of thrust within a small angular range in respect to the aircraft body. In addition to the take-off engines, there is provided one or more engines for effecting forward flight which advantageously includes arrangements for shifting from a substantially downward thrust discharge of the thrust gases to a substantially horizontal thrust discharge. Thus, the invention overcomes the difficulties of the prior art constructions by permitting substantially vertical lift of the aircraft and acceleration up to an aerodynamic speed at which the wings become effective to sustain the aircraft in flight. The aircraft constructed in accordance with the invention insures that the intermediate stages between vertical ascent during lift-off and transition to horizontal flight is controlled uniformly and without sudden change, since the engine construction and arrangement control through all the intermediate stages of change-over from vertical to stable horizontal flying.

In a preferred embodiment of the invention, the airplane is a VTOL airplane having at least one lift-off engine stationarily arranged in front of the center of gravity of the plane and including at least one "marsch" or forward propulsion engine behind the center of gravity. The latter marsch engine is advantageously provided with a nozzle group arranged in the airplane tail which includes means for switching from horizontal to substantially vertical thrust or vice-versa. The control means advantageously includes deflection arrangements for influencing jet direction and advantageously includes spoilers or deflection plates arranged at the nozzle orifices, or means such as directed jet streams, for deflecting the main thrust direction.

The control means are advantageously arranged so that the nozzle jets of the lifting engines arranged in front of the center of gravity of the aircraft can be selectively deflected forwardly or rearwardly and in one embodiment, laterally. The nozzle jet which exits from a vertical nozzle of the horizontal propulsion engine can, in accordance with the invention, be deflected in a longitudinal direction as well as laterally.

The lifting engines are advantageously arranged vertically, or in some instances, for the purpose of generating a forward velocity during their transition period, they are arranged in a slightly forwardly inclined manner so that the exiting gas jets are deflected rearwardly when they are not influenced by the control deflectors. Thus, the lift-off engines also aid in imparting a partial forward direction of movement to the airplane. In the preferred arrangement, the lift-off engines are stationarily mounted and means are provided for effecting deflection of the thrust stream as desired. Also in the preferred arrangement of the invention, the lift-off engines are rocket engines and the forward propulsion or marsch engine is one or a plurality of gas turbines.

A further feature of the invention is the construction of the forward propulsion engine in the rear or tail of the airplane. The engine includes means for directing a nozzle jet normally in the direction of the longitudinal axis of the airplane. This means may be controlled, however, so that switching may be effected in transition between starting, horizontal flight, and landing, to deflect the gas streams through a downwardly extending nozzle to aid in producing a vertically upwardly directed thrust. The engine advantageously includes a shiftable nozzle in the downwardly directed gas stream discharge which permits deflection of the thrust gases over an angular range forwardly, rearwardly and laterally which, in the preferred embodiment, is about 20°.

Accordingly, it is an object of this invention to provide an improved aircraft construction.

A further object of the invention is to provide a vertical VTOL aircraft having an improved power plant construction and arrangement.

A further object of the invention is to provide a VTOL aircraft including at least one lift-off thrust engine stationarily mounted in a position to direct thrust gases substantially vertically and including at least one thrust engine located in the rear of the craft having adjustable means for directing a gas thrust either substantially along the longitudinal axis of the aircraft or vertically.

A further object of the invention is to provide an aircraft having a plurality of take-off engines, advantageously of a rocket type, located preferably forward of the center of gravity, with means for deflecting the thrust of the gas discharged therefrom forwardly, rearwardly or laterally and further including at least one additional forward propulsion engine which includes means for directing thrust gases substantially outwardly along the longitudinal axis of the aircraft and over a range of angles extending downwardly from the aircraft.

A further object of the invention is to provide a VTOL aircraft including an engine arrangement which permits substantially vertical lifting of the aircraft and an easy transition between vertical and horizontal flight by means of thrust engines which have means for adjusting the direction of thrust gases.

A further object of the invention is to provide a lift-off thrust engine having control means for deflecting the direction of thrust gases.

A further object of the invention is to provide a lift-off thrust engine having control means for deflecting the direction of the discharge of thrust gases therefrom.

A further object of the invention is to provide a propulsion engine for aircraft, which includes thrust discharge openings located at substantially wide angles to one another and control means for controlling the discharge of gases from one or the other of such discharge openings.

A further object of the invention is to provide an aircraft construction and power plant construction for such aircraft which are simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 4 is an enlarged elevation of a lift-off engine constructed in accordance with the invention, having spoilers for deflecting the thrust gas discharge;

FIG. 5 is a view similar to FIG. 4 of another embodiment of lift-off engine;

FIG. 6 is a side elevation partly in section of a forward propulsion or "marsch" engine constructed in accordance with the invention;

FIG. 7 is a section taken on the line 7—7 of FIG. 6; and

FIG. 8 is a partial view of an aircraft similar to FIG. 1, but indicating the lift-off engines arranged in a slight inclined position.

Figure 1:
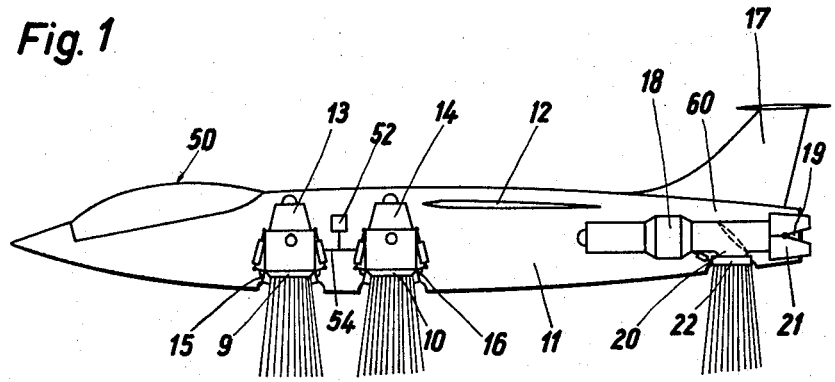
FIG. 1 is a schematic side elevational and sectional view of an aircraft constructed in accordance with the invention, with the engine controls indicated in an operative position for substantially vertical lift-off.

Referring to the drawings in particular, the invention embodied therein includes an aircraft generally designated 50 having a fuselage 11 with outstanding wing surfaces 12 (only the port one being indicated). Wing surface 12 is dimensioned so that it will sustain the aircraft 50 aerodynamically for forward flying velocities over Mach of 0.3.

In accordance with the invention, the aircraft 50 is provided with lift-off engines 13 and 14 which are advantageously secured to the craft within the fuselage at a location forward of the center of gravity and the wing 12. The aircraft 50 also includes, at a location adjacent a tail 60, a combined forward propulsion and lift engine generally designated 18.

The lifting engines 13 and 14 are advantageously arranged one after the other along the longitudinal length of the aircraft 50 in a position to generate a thrust substantially in the direction of the vertical axis of the aircraft. The lift-off engines 13 and 14 include nozzles 9 and 10 which are provided with control elements or spoilers 15 and 16 for influencing the direction of the thrust gases or jets. The spoilers 15 and 16 are advantageously located to direct the thrust gases at least in directions forwardly or rearwardly, and in some instances, laterally.

Referring to FIG. 4, the lift-off engine 13 includes a spoiler plate or plates 15 which is carried by and guided by parallel linkage arms 26 and 34 under the influence of a fluid operated cylinder 27. The cylinder 27 is supplied with fluid from a control device 52 through line 54 for the purpose of accurately directing the thrust gases by positioning the spoiler plate 15. Piston rods 27a, 27a are reciprocal in the control cylinders 27, 27 and are directed in accordance with the control signal from the control element 52 alternatively upwardly or downwardly in the cylinders 27, 27 in order to shift the spoiler 15. The control means 52 advantageously operates to permit separate control of the lift-off engines 13 and 14 or combined control thereof, as desired.

In FIG. 5, an alternate embodiment of control for the thrust gases is indicated for a thrust engine 13'. This includes means for directing air or other fluid in the vicinity of a discharge of a nozzle 28 which is blown in the vicinity of the exit of the nozzle 28 by control nozzles 30 and 31. Blowing from the nozzle 30 causes a jet deflection rearwardly, while blowing from the nozzle 31 causes a jet deflection forwardly. A throughput direction regulator 32 is provided which is supplied with compressed air from the line 33 and provides a control for the deflection of the compressed air to either the nozzle 30 or 31. As indicated in FIG. 6, the marsch or combination forward and vertical lift engine 18 is provided with a rear nozzle 19 which is situated to direct gases substantially rearwardly along the longitudinal axis of the airplane. The engine 18 also includes a nozzle 20 which provides a vertical thrust for aiding in upward flight.

The engine 18 discharges into a space 37 which connects through a tubular extension 37a to the rear nozzle 19 and, through a tubular extension 37b at substantially a right angle thereto, to the nozzle 20. A flap 23 is arranged in the space 37 for controlling the direction of gases permitting downward flow into the extension 37b when in the position indicated in solid lines, and rearward flow in to the nozzle 19 when in the position shown in the dot-dash lines. A flap 24 is located in the tubular extension 37b and permit downward flow of the thrust gases to the tubular extension 37b and the nozzle 20 when in the solid line position, but closes off the tubular extension 37b and prevents thrust gas flow therein when in the dot-dash line position. In the solid line positions indicated, thrust gas flow is downwardly through the nozzle 20 to aid in upward flight.

A control nozzle 22 is advantageously pivotally mounted on the exterior of the nozzle 20 and it may be shifted about this pivotal mounting by means of a control cylinder 35 which moves a piston rod control lever 35a for the control of fluid admitted through a control conduit 56. In the embodiment illustrated, the nozzle 22 may be rocked about the exterior surface 25 of the nozzle 20 in the longitudinal direction, either forwardly or rearwardly. In addition, the control nozzle may be rocked laterally by the operation of the control cylinder 36 (FIG. 7) acting through piston rod 36a under the control of fluid admitted through a control line 58. Thus, the nozzle may be controlled in all respects about the vertical axis of the aircraft to cause acceleration or retardation of the aircraft in respect to forward flight, for example, and to influence the lifting or descent as well as the turning of the aircraft.

The nozzle 19 is advantageously provided with flaps 21 which are pivotally connected at the center of the nozzle but which may be adjustably moved by suitable control means (not shown) to completely close or partially constrict the nozzle cross section.

In the embodiment indicated in FIG. 8, lifting engines 43 and 44 are provided which are arranged in a slightly inclined manner so that gases may be directed vertically and rearwardly. These lifting engines not only lift the aircraft in a vertical direction from the ground, but accelerate the aircraft up to a Mach value of 0.3. They are located in a fixed manner on the fuselage 41 with an inclination angle in respect to the vertical axis of the fuselage indicated.

In accordance with the invention, it is possible that the aircraft be accelerated with the best possible engine efficiency or output coefficient and with security during the transition between the vertical flight and forward flight at the required Mach speed. The aircraft advantageously starts with a jet deflected by control means 45 and 46, or with inclined longitudinal axis so that the thrust of these engines acts vertically without using the control means 45 and 46.

Figure 3:
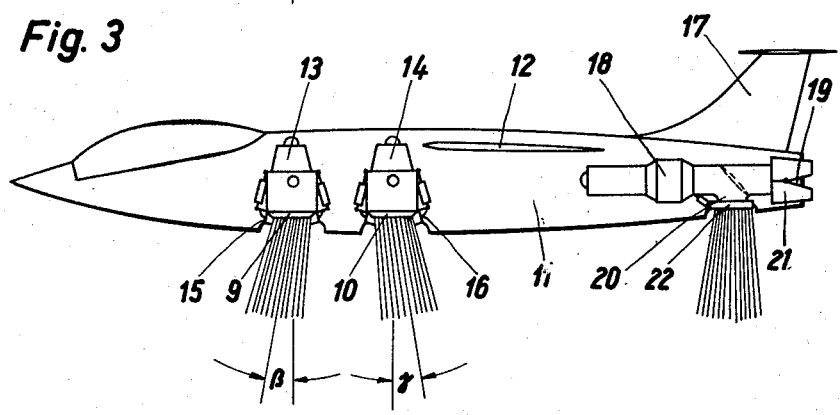
FIG. 3 is a view similar to FIG. 1, indicating the aircraft with the engine controls indicated during the initiation of a tilting movement.

The airplane operates as follows: The control means 15, 16 and 22 which influence the vertical nozzle jets from the engines 13, 14 or 18, respectively, are first adjusted so that the driving gases are blown vertically downwardly, independently of whether the aircraft stands with an exactly horizontal axis or with a slightly inclined longitudinal axis in respect to the ground. The starting engines thus cause a thrust which is directed vertically upwardly. The control about the transverse axis then is effected after the lift-off by tilting the direction of the thrust gases of the two front engines 13 and 14 relatively to each other as indicated in FIG. 3.

Deflection of the nozzle jet of the front engine 13 by the spoiler 15 about the angle $\beta$ (FIG. 3) forwardly and of the rear engine 14 by the spoiler 16 about the angle $\alpha$ rearwardly causes, for example, a reduction of the vertical component of the resultant thrust of both engines. In this manner, the engines impart a tilting movement which acts on the head of the plane.

In order to generate a horizontal acceleration with a simultaneously acting tilting movement, the angles $\beta$ and $\alpha$ are made different from one another. For forward acceleration, angle $\alpha$ is larger than angle $\beta$.

The control about the vertical axis is accomplished by lateral deflection of the nozzle jet from the nozzle 20 through the control nozzle 22. For control about the longitudinal axis, the lifting engines may be provided with means for the lateral deflection of the jets or thrust gases. This kind of control, however, is advantageously only employed with aircraft with a low moment of inertia about its longitudinal axis.

Figure 2:
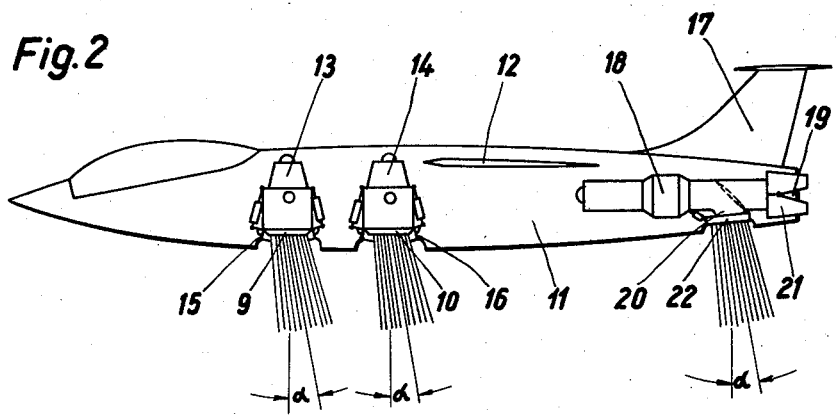
FIG. 2 is a view similar to FIG. 1, indicating the engine controls in an operating position in which the gases are deflected slightly rearwardly during the transition between vertical and horizontal flight.

In order to accomplish forward speed, all of the nozzle jets are deflected about the same angle $\alpha$ rearwardly in the direction of the longitudinal axis of the aircraft, as indicated in FIG. 2. The acceleration by such a jet deflection will last for a period sufficient to establish a velocity which is necessary for aerodynamically carrying the aircraft on the wings 12 which is about the speed of about Mach 0.3. At this speed, flaps 23 and 24 are then jointly reversed (see FIG. 6) so that the jet gases produced by the engine 18 will not be directed through the nozzle 20, but through the nozzle 19 in a horizontal direction.

At the same time, the lift-off engines 13 and 14 will be switched off so that all vertical thrust forces are jointly switched off. The aircraft from this moment on flies aerodynamically by means of the wings 12 as well as stabilizing surfaces 17. The control about vertical and transverse axes is accomplished by adjusting an aerodynamic rudder (not shown) at the stabilization surfaces 17.

Thus, the invention provides a simply constructed aircraft which may operate for rapid take-off and landing and which permits a smooth transition between substantially vertical take-off and forward flying attitudes.

While specific embodiments of the invention have been shown and described in detail to illustrate the application of the inventive principles, it will be understood that the invention may be embodied otherwise without departing from such principles.

What is claimed is:

1. An aircraft comprising a fuselage, at least one first thrust engine means arranged forward of the center of gravity of said aircraft in a fixed position for directing thrust gases downwardly for lifting the aircraft vertically, means for deflecting thrust gases directed downwardly by said first thrust engine both in forward and rear directions and laterally and at least one second thrust engine means aft of the center of gravity having means for selectively directing thrust gases downwardly and rearwardly for vertical and forward flight, respectively.

2. An aircraft according to claim 1, wherein said means for deflecting the thrust gases of said first thrust engine includes spoiler plates arranged at the discharge of said first thrust engine means.

3. An aircraft according to claim 1, wherein said means for deflecting the thrust gases of said first thrust engine includes pressurized fluid means at the location of the discharge of said thrust gases.

4. An aircraft according to claim 1, wherein said second thrust engine means includes a rearwardly extending gas discharge nozzle and a downwardly extending gas discharge nozzle, and baffle plate means for selectively directing gases through said rearwardly extending gas discharge nozzle and said downwardly extending gas discharge nozzle.

5. An aircraft according to claim 1, wherein said first thrust engine means is mounted at an angle to the vertical axis of the aircraft.

6. An aircraft according to claim 1, wherein said second thrust engine means is aft of the center of gravity and includes a first nozzle for directing thrust gases rearwardly for horizontal flight, and a second nozzle for directing gases downwardly for vertical flight, and control baffle means in said engine for permitting discharge of thrust gases from only one of said first and second nozzles alternatively.

7. An aircraft according to claim 6, wherein said second thrust nozzle includes means for shifting the direction of thrust gases.

8. An aircraft according to claim 1, wherein said second thrust engine means includes a first nozzle arranged to direct thrust gases downwardly and movable nozzle means on said first nozzle for shifting the direction of the thrust gases from the vertical.

9. A vertical takeoff and landing aircraft comprising a fuselage having an air foil wing arranged in the center of gravity of said aircraft, at least two lift engines mounted in a fixed position on said fuselage before the center of gravity of said aircraft, and at least one combination forward propulsion and lift engine mounted on said fuselage behind the center of the gravity of said aircraft and providing corrective lift about the center of gravity in respect to the lift provided by said lift engines, said combination forward propulsion and lift engine having means for selectively directing thrust gases substantially vertically and substantially horizontally, and means adjacent the discharge of said lift engines and said combination forward propulsion and lift engine for deflecting propelling gases from the vertical in any selected direction.

10. A vertical takeoff and landing aircraft according to claim 9, wherein there are at least two cruising engines, each located behind the center of gravity of said aircraft.

11. A vertical takeoff and landing aircraft comprising a fuselage, an air foil wing extending outwardly from each side of said fuselage adjacent the center of gravity of said aircraft, at least two lift engines mounted on said fuselage forward of the center of gravity, means associated with said lift engines for deflecting thrust gases forwardly, rearwardly and laterally, and at least one combination forward propulsion and lift engine mounted on said fuselage behind the center of gravity of said aircraft and providing corrective lift about the center of gravity in respect to the lift provided by said lift engines, said combination forward propulsion and lift engine having means for selectively directing thrust gases substantially vertically and alternatively substantially horizontally for providing thrust for lift and for propulsion, respectively.

References Cited in the file of this patent

UNITED STATES PATENTS

| | | |
|---|---|---|
| 2,735,264 | Jewett | Feb. 21, 1956 |
| 2,959,378 | Eggers | Nov. 8, 1960 |
| 2,964,905 | Hewson et al. | Dec. 20, 1960 |
| 2,974,907 | Eggers | Mar. 14, 1961 |
| 3,041,830 | Thomas | July 3, 1962 |

FOREIGN PATENTS

| | | |
|---|---|---|
| 600,397 | Great Britain | Apr. 7, 1948 |
| 733,931 | Great Britain | July 20, 1955 |
| 1,053,321 | Germany | Mar. 19, 1959 |

OTHER REFERENCES

Short SC-1 aircraft as disclosed in Popular Mechanics Magazine, page 90, May 1957.